Figure 1:
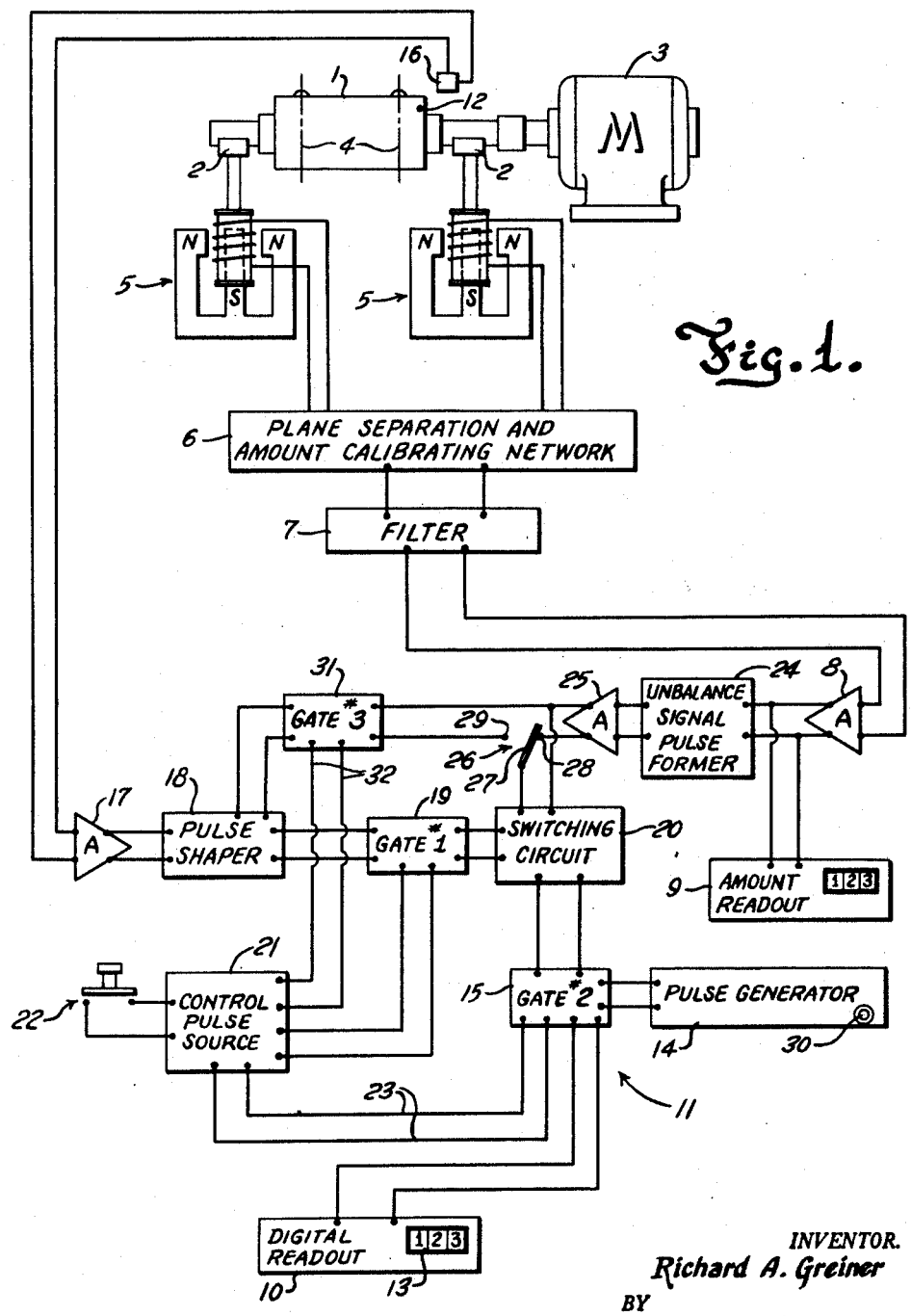

INVENTOR.
Richard A. Greiner
BY
Andrus & Starke
Attorneys

United States Patent Office 3,184,976
Patented May 25, 1965

3,184,976
DIGITAL MEASURING SYSTEM
Richard A. Greiner, Madison, Wis., assignor to Gisholt Machine Company, Madison, Wis., a corporation of Wisconsin
Filed May 8, 1961, Ser. No. 108,404
9 Claims. (Cl. 73—462)

This invention relates to a digital measuring system and particularly to a digital angle-measuring system for balancing equipment.

Balancing apparatus for measuring unbalance in rotating devices has employed a phase comparison of a reference signal generated in synchronism with the rotation of a reference location on the device and an unbalance created signal to determine the location of unbalance in the device. Generally, an alternating current signal is generated in phase relationship with the unbalance. The unbalance signal may be amplified, shaped and clipped to form a triggering pulse and a reference pulse established to conjointly energize a suitable angle indicating means having an output proportional to the phase angle between the two signals.

A particularly inexpensive and accurate method of determining unbalance is disclosed in a copending application of Werner I. Senger entitled Digital Balancing Equipment, Serial No. 37,990, filed on June 22, 1960, and assigned to a common assignee with this application. As more fully disclosed therein, a digital readout is actuated in accordance with the angular displacement of the actual unbalance from a reference location in the rotating device. The present invention is particularly directed to a highly satisfactory digit circuitry for measuring such angular displacement.

In accordance with the present invention, a pulse source is synchronized to generate a precise number of clock pulses for each revolution of the device in which unbalance is being measured. The output of the pulse source is connected by a circuit gate to drive an angle output means to provide a reading of the angular displacement. A periodic reference pulse signal is established in accordance with the frequency of the rotating device. An unbalance related pulse signal is established in phase with a preselected point in the unbalance signal.

The reference pulse signal opens the gate to establish the transmission of clock pulses via the gate to the output means. The first clock pulse transmitted from the circuit gate to the output means is also fed back to prevent further transmission of succeeding reference pulses. The unbalance related pulse then closes the gate. The unbalance related pulse signal and the reference pulse signal are thus connected to conjointly control the circuit gate and to open the circuit gate for a precise period which is proportional to the phase difference between the pulse signals. The output means is therefore actuated in accordance with the angular displacement of the unbalance from the reference location in the rotating device. The angular displacement of unbalance is indicated in any suitable output means within a single revolution of the device in which unbalance is being measured.

In accordance with another aspect of the present invention, a circuit is provided for disconnecting the unbalance signal source from the gate and interconnecting the reference pulse source through two different circuits. Two reference pulses are successively applied to the circuit gate to open and close the circuit gate for one revolution of the device. During this period, the pulse source transmits the clock pulses in accordance with a preselected frequency. The pulse source may then be adjusted to establish the number of pulses transmitted per revolution of the device for suitable calibration of the output means.

If visual readout is employed as the output means, full angle displacement reading may be obtained by adjusting the pulse source to provide 360 pulses per revolution of the device. Any other multiple or submultiple reading can be provided by proper adjustment of the pulse source. Similarly, in automatic balancing correction, a direct digital signal can be provided for actuating a correction tool. A ready and simple means for calibrating a digital type output means is thereby provided.

The drawings furnished herewith illustrate the best mode presently contemplated for carrying out the invention.

Figure 2:
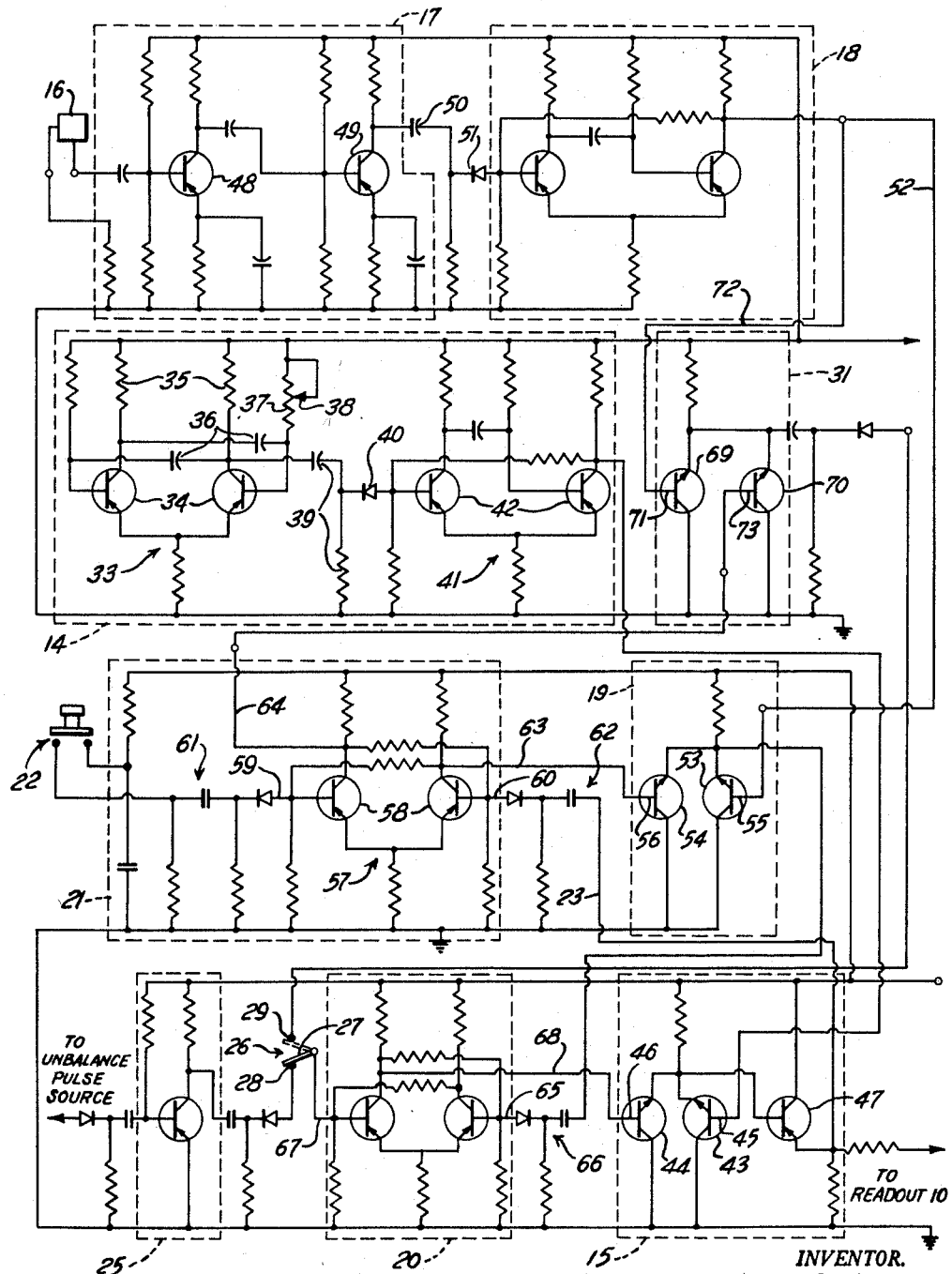

In the drawings:

FIG. 1 is a diagrammatic illustration of balancing equipment incorporating a preferred angle-measuring system in accordance with the present invention; and FIG. 2 is a schematic circuit diagram employing a transistorized circuit for the measuring system shown in FIG. 1.

Referring to the drawings and particularly to FIG. 1, the present invention is applied to measuring unbalance in a rotating apparatus or member diagrammatically shown as a rotor 1 in which unbalance is to be measured. The illustrated rotor 1 includes axially extending end journals which are flexibly mounted in bearings 2 to allow free movement or translation of the rotor 1. A separate prime mover 3, shown as a motor, is coupled to one end journal of the rotor 1 and is adapted to drive the rotor 1 at a preselected balancing speed at which detectable unbalance vibration is created in rotor 1.

The illustrated embodiment of the invention is for customary two plane balancing wherein a pair of axially spaced correction planes 4 are selected within rotor 1 in which unbalance correction can conveniently be made by either the removal or the addition of material and the rotor 1 thereby statically and/or dynamically balanced. The invention is equally applicable to all other forms of balancing requiring an angular location.

Suitable transducers or pickups 5 are coupled to the bearings 2 and respond to the unbalanced effect on the rotor 1 at the bearings 2. Pickups 5 are diagrammatically illustrated as electromagnetic type units in which an alternating current signal is created in accordance with the unbalance created movement and displacement of the bearings 2. The displacement of bearings 2, and consequently the A.C. signal generated, is directly proportional to the amount of unbalance in the correction planes 4 and the frequency of the output of the A.C. signal generated corresponds to the rotational frequency of the rotor 1.

A plane separating and calibrating network 6 is connected to the output of both pickups 5. The network 6 is of any suitable variety having a first and second output one of which is proportional to the unbalance related effect in the left-hand correction plane 4 and the other of which is proportional to the unbalance related effect in the right-hand correction plane 4.

A filter 7 is connected to the output of the network 6 and is tuned to pass a selected unbalance signal and to eliminate other signals which may be superimposed upon the unbalance signal. An amplifier 8 is connected to the output of filter 7 and increases the level of the filtered signal to a useful level. An amount readout 9 and an angle readout 10 are connected to the output of the amplifier 8 to record the amount and the angle of unbalance in the respective correction planes 4.

The amount readout 9 is of any suitable construction adapted to determine the amount of unbalance in accordance with the unbalance signal applied from the amplifier 8.

Angle readout 10 is a digital type and a pulse generating and transmitting circuit 11 connects the output of the amplifier 8 thereto for actuating readout 10 in accordance with the displacement of unbalance from a preselected radial reference plane shown by the point 12 on the rotor 1.

The illustrated digital angle readout 10 is a suitable counter or other similar device which is adapted to be actuated by a series of electrical pulses. A readout indicator 13 is provided in the readout 10 to provide a visual indication in the decimal system of the angular displacement from point 12.

The circuit 11 generally includes a suitable pulse generator 14 which is adapted to establish a fixed number of equally time-spaced clock pulses for every revolution of the rotor 1. An output gate 15 connects the output of the generator 14 to the input of the digital angle readout 10 for selective actuation of the readout 10.

In accordance with the present invention, gate 15 is opened and closed in accordance with the time period between a reference pulse generated in synchronism with the rotation of the reference point 12 and an unbalance created pulse generated in synchronism with a preselected point in the A.C. unbalance signal from amplifier 8. A zero cross-over point, when the A.C. signal from amplifier 8 is changing between a positive and negative polarity, is a conveniently selected point in the signal.

A reference signal pickup 16 preferably of the non-reaction type such as a proximity or photoelectric type is mounted immediately adjacent to rotor 1 in radial alignment with the point 12 in rotor 1. For purposes of illustration, a photoelectric pickup 16 is assumed. Point 12 is provided with distinct coloration with respect to the remaining portion of the circle including the point 12. The photoelectric pickup 16 therefore establishes one reference pulse for each revolution of the rotor 1 in synchronism with the rotation of the reference point 12 past pickup 16. An amplifier 17 is connected to pickup 16 and amplifies the generated reference pulse to a useful level. A pulse shaper 18 is connected to the output of the amplifier 17 and shapes the reference pulse to a predetermined amplitude for reliable actuation of the following circuitry.

A reference control gate 19 is connected to the output of the pulse shaper 18 to allow selective control of the transmission of the reference pulses.

An on-off switching circuit 20 has a first input connected to the output of the gate 19. The circuit 20 is adapted to have either of two stable output conditions and is connected to control the output gate 15. In one stable output state of circuit 20, the gate 15 is held open whereas in the opposite stable output state, the gate 15 is held closed. A reference pulse from gate 19 energizes the switching circuit 20 to establish an output signal opening the gate 15 and allowing transmission of clock pulses from the generator 14 to the angle digital readout 10.

The gate 19 is selectively controlled to pass reference pulses from shaper 18 to circuit 20, in the following manner.

A control pulse source 21 includes an output connected to open and close gate 19. The pulse source 21 normally establishes an output holding the gate 19 closed. A manually actuable start switch 22 is provided for switching of source 21 to establish an output which opens the gate 19 and allows transmission of a reference pulse from the pulse shaper 18 to the on-off switching circuit 20 for opening of gate 15.

Feedback lines 23 connect the output of gate 15 to a second input to the control pulse source 21. The first clock pulse transmitted through gate 15 is fed back and reverses the output of source 21 to the normal stand-by condition holding gate 19 closed. Transmission of a second reference pulse to circuit 20 is prevented and the reference pulse is only employed to initiate the counting or measuring cycle.

The clock pulses from generator 14 are transmitted through gate 15 to actuate the readout 10 until a closing signal is received from the amplifier 8, in accordance with the following construction.

A pulse former 24 is connected to the output of the amplifier 8 and establishes an unbalance created pulse in synchronism with a preselected point in the A.C. unbalance signal. Pulse former 24 may for example include suitable squaring, differentiating and clipping circuitry to establish a pulse at alternate zero cross-over points in the A.C. unbalance signal. The unbalance signal is in phase with the unbalance in the rotating part and consequently the phase is directly related to the reference point 12 on the rotor 1. The output pulse from pulse former 24 is therefore displaced in time from the reference pulse in proportion to the angular displacement between the reference point 12 and the location of actual unbalance in rotor 1.

A pulse amplifier 25 is connected to the output of pulse former 24 and increases the pulses to a useful and uniform operating level. The output of the pulse amplifier 25 is connected to a second input to the on-off switching circuit 20 by a calibrating switch 26.

The calibrating switch 26 is a single-pole, double-throw type connected in one of the lines between the amplifier 25 and the circuit 20. The switch 26 includes a single pole 27 connected to one input terminal of the circuit 20 and an unbalance signal contact 28 connected to one side of the output of the pulse amplifier 25. Switch 26 also includes a calibrating contact 29 connected as subsequently described to allow calibrating of the readout 10 to read directly in preselected units.

The unbalance signal from amplifier 8 is thus formed into a suitable pulse and after amplification, applied to the on-off switching circuit 20 to establish the second stable state of circuit 20. The second output state of circuit 20 closes gate 15 and effectively disconnects generator 14 from readout 10.

The transmission of clock pulses from the generator 14 to the digital angle readout 10 ceases in accordance with the establishment of the unbalance created pulse. The time period between the reference pulse established from pickup 16 and the unbalance pulse established from pickups 5 is directly proportional to the angular displacement between reference point 12 on the rotor 1 and the actual location of unbalance in rotor 1. The number of clock pulses transmitted from generator 14 to readout 10 is therefore proportional to angular displacement and readout 10 is actuated accordingly.

The generator 14 is preferably provided with a pulse rate control knob 30 to permit generation of any desired multiple or submultiple of 360 pulses per revolution of the rotor 1. This permits actuation of the readout 10 to read directly in degrees or any multiple thereof.

In accordance with the illustrated embodiment of the invention, the following calibrating circuitry is provided.

A calibration gate 31 is connected to the output of the pulse shaper 18 in parallel to gate 19. The calibrating switch 26 selectively connects the output of the calibration gate 31 to the second input of the switching circuit 20 for establishing the second stable state of the circuit 20 and closing of gate 15 upon the transmission of a reference pulse through gate 31.

During normal balancing operation, switch 26 is positioned to disconnect the gate 31 from the circuit 20 and prevent transmission of a reference pulse via gate 31 to circuit 20.

During calibration, switch 26 is positioned to connect gate 31 to circuit 20 and permit calibration as follows.

The control pulse source 21 is connected by control lines 32 to control the opening and closing of the gate 31, simultaneously with the closing and opening of gate 19. Therefore, the pulse shaper 18 is connected to the switching circuit 20 through either the gate 19 or the gate 31 with switch 26 in the calibrating position.

Calibration of the pulse rate output of generator 14 is accomplished as follows.

The calibrating switch 26 is positioned with the pole 27 engaging the calibrating contact 29 to connect the gate 31 to the second input of the on-off switching circuit 20. Motor 3 is energized to rotate the rotor 1 at balancing speed. The control pulse source 21 holds gate 19 closed and gate 31 open. Reference pulses are therefore fed to circuit 20 through gate 31. Circuit 20 is normally in the second stable state and the reference pulses have no operational effect.

Start switch 22 is closed and the control pulse source 21 is actuated to close calibration gate 31 and to open the reference pulse gate 19. The next reference pulse from pickup 16 is established as reference point 12 passes pickup 16 and is transmitted via the pulse shaper 18 and the opened gate 19 to the on-off switching circuit 20. The first stable condition of circuit 20 is established and the output gate 15 is opened allowing the clock pulses from the generator 14 to pass to the readout 10.

The first clock pulse transmitted through the gate 15 is also impressed by the feedback lines 23 on the control pulse source 21. The pule reverses the output of pulse source 21 to close gate 19 and to open gate 31. The second reference pulse established when the point 12 again passes the pickup 16 is then transmitted from the shaper pulse 18 via the gate and the calibration switch 26 to the second input of the on-off switching circuit 20.

The gate 15 is thereby opened for precisely one revolution of the rotor 1 and the generator 14 actuates the readout 10 for the corresponding period. Assuming the readout 10 is to read directly in the number of degrees, the indicator 13 should show a 360 reading. If a higher or lower reading is established, control knob 30 is reset to increase or decrease the frequency of the clock pulses until a correct reading is obtained.

After calibration of readout 10, subsequent rotors can be balanced in the customary manner.

Referring particularly to FIG. 2, a preferred transistorized circuit is shown for the generating and transmitting circuit 11 shown in FIG. 1.

In the following description, bias components, stabilizing components and the like, although shown in preferred circuitry are not specifically described except where desirable to maintain clarity and continuity of explanation of the circuitry. Further, NPN and PNP transistors as illustrated can be replaced with opposite polarity types by suitable bias modification and the like. The elements not described will be clearly understood by those familiar with transistor circuitry.

The various devices shown in block diagram in FIG. 1 are similarly shown in correspondingly numbered dotted blocks in FIG. 2.

Referring particularly to FIG. 2, the pulse generator 14 is shown including a free-running multivibrator 33 including a pair of transistors 34. Similar collector load resistors 35 and coupling capacitors 36 interconnect the collector of one transistor to the base of the opposite transistor to form a collector-coupled multivibrator circuit. The frequency of the pulses generated is dependent upon the resistance connected in the circuit. A potentiometer 37 is included in the base of the one transistor 34 and allows adjustment of the frequency output of the multivibrator 33. The control knob 30 of FIG. 1 is connected to the potentiometer slider 38 for suitable adjustment of the frequency output.

A single potentiometer 37 is illustrated for purposes of clarity although in actual practice, course and fine adjustment potentiometers are preferably employed.

A capacitor-resistor combination 39 is connected to the output of the multivibrator 33 and constitutes a differentiating circuit establishing negative and positive pulses coincident with the negative and positive going fronts in the output of the multivibrator 33. A clipping diode 40 is connected to the combination 39 to pass only the negative pulses to a pulse shaper 41 also forming a part of generator 14.

The shaper 41 shapes the clock pulse signals to a predetermined width and amplitude for reliable operation of the readout 10. Generally, the illustrated pulse shaper 41 includes a pair of transistors 42 interconnected in accordance with known circuitry to establish a monostable multivibrator. The output of shaper 41 and therefore generator 14 is a series of pulses of predetermined width and amplitude constituting the clock pulses for operating the readout 10. The clock pulses from shaper 41 are fed to the gate 15 which selectively transmits the clock pulses to actuate the readout 10.

The illustrated gate 15 includes an output transistor 43 and a control transistor 44 of the NPN type which are interconnected to form an AND gate. The base 45 of output transistor 43 constitutes a first input and is connected to the output from the pulse shaper 41. The base 46 of control transistor 44 constitutes a second input and is connected to the output of the on-off switching circuit 20. In the stand-by position, circuit 20 establishes a bias on the base 46 which holds the gate 15 closed and prevents pulses from the pulse shaper 41 of generator 14 passing through the gate 15. The on-off switching circuit 20 is actuated by a pulse from the pickup 16 as hereinafter described to apply a reference related bias to the base 46 of the control transistor 44 which opens the gate 15 to establish clock pulses at the output of the gate 15.

An amplifying transistor 47 forms a part of the output circuit gate 15, as shown in FIG. 2, and increases the clock pulses to a useful level for operation of the angle readout 10 and the control pulse source 21.

The reference pulse from pickup 16 for opening gate 15 is applied to amplifier 17 which is illustrated in FIG. 2 as including a pair of transistor amplifiers 48 and 49 connected in cascade to increase the level of the small reference pulses generated by pickup 16. A capacitor 50 and a diode 51 connect the output of the amplifier 17 to the pulse shaper 18. The diode 51 clips or rejects the positive signal and transmits only the negative signal pulses to the pulse shaper 18.

Pulse shaper 18 as shown in FIG. 2, is a monostable multivibrator generally corresponding in construction to the pulse shaper 41 forming a part of generator 14. The pulse shaper 18 forms the reference pulses to a preselected height for reliable and uniform circuit functioning.

An output lead 52 connects the output of the shaper 18 directly to the reference control gate 19.

The illustrated gate 19 in FIG. 2 includes an output transistor 53 and a control transistor 54 interconnected in the same manner as transistors 43 and 44 of gate 15 to form an AND gate. Base 55 of transistor 53 is connected by lead 52 to the output of the shaper 18. Base 56 of the control transistor 54 is connected to the output of the control pulse source 21 for selective opening and closing of gate 19.

Control pulse source 21 is illustrated including a bistable multivibrator 57 formed of a pair of transistors 58 interconnected in a known manner to provide two stable states; with a different one of the transistors 58 conducting in each stable state. The stable states of the multivibrator 57 are alternately established by application of proper triggering pulses to a pair of input leads 59 and 60.

Input lead 59 is connected to start switch 22 through a filtering and steering circuit 61. When switch 22 is closed, a signal is applied to multivibrator 57 to establish one stable state and results in an output opening reference pulse gate 19 and closing the calibration gate 31.

Input lead 60 to source 21 is connected to the output of gate 15 through a differentiating and steering circuit 62. A clock pulse from gate 15 is applied to multivibrator 57 of source 21 to establish the second stable state and results in an output closing reference pulse gate 19 and opening calibration gate 31.

Output leads 63 and 64 of multivibrator 57 are connected respectively to reference pulse gate 19 and the calibration gate 31 to condition the gates 19 and 31 in accordance with the output state of the control pulse source 21.

The closing of switch 22 thus opens the reference control gate 19 and transmits a reference pulse from the pulse shaper 18 to the on-off switching circuit 20.

The on-off switching circuit 20 is a bistable multivibrator generally corresponding to the bistable multivibrator 57 having an input lead 65 connected to the output of gate 19 through a coupling circuit 66 and an input lead 67 connected to the calibration switch 26. Circuit 20 includes two stable states alternately established by applying proper triggering pulses to input leads 65 and 67. The switching circuit 20 includes a single output lead 68 connected to the base 46 of control transistor 44 in the output gate 15.

A proper triggering pulse on lead 65 establishes an output on lead 68 to bias the gate 15 open. Lead 65 is connected to the output of gate 19, which, when open, transmits a reference pulse for initiating a counting cycle.

A proper triggering pulse on lead 67 to circuit 20 establishes an output at lead 68 to bias the gate 15 closed. Lead 67 is selectively connected to calibration gate 31 or to the unbalance pulse source 24 via amplifier 25 by the positioning of switch 26. Depending upon the position of switch 26, the counting cycle is determined by a second reference pulse or by an unbalance related pulse.

In the full line position of switch 26, the unbalance related pulse from amplifier 25 is impressed on circuit 20 to establish the stable state which closes the gate 15. The unbalance related pulse is displaced in time from the reference pulse in proportion to the angular displacement of unbalance from point 12 in rotor 1 and gate 15 is therefore open for a period proportional to the angular location of unbalance from point 12. The readout 10 provides a recording of this angle.

The dotted line position of switch 26 connects the second reference pulse to circuit 20 to close gate 15 after one full revolution of rotor 1. This allows adjustment of potentiometer 37 in generator 14 to obtain the pulse rate for preselected operation of readout 10.

In FIG. 2, calibration gate 31 is shown similar to the output gate 15 and the reference control gate 19 and includes an output transistor 69 and a control transistor 70 forming an AND gate. Base 71 of output transistor 69 is connected by a lead 72 to the output of pulse shaper 18 and, when gate 31 is open, a reference pulse is transmitted via switch 26 to input lead 67 of bistable multivibrator 57 forming the on-off switching circuit 20. Base 73 of control transistor 70 is connected to the output line 64 of control pulse source 21 and is opened and closed in accordance with the output of the pulse source 21.

With the calibration switch 26 in the dotted line position and prior to closing switch 22, pulse source 21 holds the gate 31 open and gate 19 closed.

Gate 31 is operatively connected in the circuit via switch 26 and a reference pulse from pickup 16 is transmitted to the on-off switching circuit 20 via lead 65. The circuit 20 is in the stable condition resulting from a triggering pulse at lead 65 and the reference pulse therefore has no operative effect. The start switch 22 is then actuated and the bistable multivibrator 57 forming control pulse source 21 is biased to the second stable state opening gate 19 and closing gate 31. A reference pulse is now transmitted via the gate 19 to the circuit 20 which changes its stable state to open the gate 15 and allow transmission of the clock pulses from the generator 14 to readout 10. The first clock pulse is fed to the readout 10 and via the feedback line 23 to input lead 60 to reverse the state of the bistable multivibrator 57 of source 21 and to thereby again close the gate 19 and open gate 31. The next reference pulse from the pickup 16 is transmitted through the gate 31 and switch 26 to reverse the state of circuit 20 and close gate 15 at the end of one complete revolution of rotor 1.

In FIG. 2, the potentiometer 37 in multivibrator 33 of pulse generator 14 is adjusted to insert the necessary resistance in the circuit of the multivibrator to generate the desired number of clock pulses per revolution of the rotor 1.

After calibration of readout 10, the balancing operation of the embodiment of the invention illustrated in FIGS. 1 and 2 is as follows.

Switch 26 is placed in the full line position to connect unbalance pulse amplifier 25 to input lead 67 of the on-off switching circuit 20. A rotor 1 is mounted in bearings 2 and driven by motor 3 to establish an output voltage signal in the pickups 5 in accordance with the amplitude and rotational frequency of the unbalance. Rotor 1 is prebalanced or a suitable network provided for simulating balance in the circuit to allow plane separation and calibration of the amount readout 9. Known unbalance is sequentially provided in each correction plane 4 for adjusting of network 6. Network 6 is set to provide output signals proportional to unbalance attributable to unbalance in correction planes 4 and to establish a proper amplitude of the signal for calibrating the readout 9. The output of the network 6 is filtered by filter 7 to remove unwanted signals and amplified by amplifier 8 to increase the level of the unbalance signal.

The amplified unbalance signal is impressed upon the amount readout 9 to record the amount of unbalance in accordance with the amplitude of the unbalance signal.

Simultaneously, the unbalance signal is transmitted by the generating and transmission circuit 11 to actuate the digital angle readout 10.

The start switch 22 is actuated, either manually or through a suitable control or sequencing means, not shown, and establishes a triggering signal at input 59 of bistable multivibrator 57 which switches to the alternate stable state and establishes control signals at the output leads 62 and 64 which are connected respectively to gates 19 and 31.

Gate 19 opens and gate 31 closes. A reference pulse from pickup 16 is amplified and shaped and then transmitted via gate 19 to on-off switching circuit 20. The reference pulse switches the bistable multivibrator forming circuit 20 to the alternate stable state establishing an output opening gate 15. The clock pulses from generator 14 then pass to readout 10.

The first clock pulse is also impressed by line 23 upon the second input lead 60 of control pulse source 21 which switches to the alternate stage; closing gate 19.

The clock pulse actuates the readout 10 in proportion to the number of pulses transmitted.

The unbalance pulse is impressed on the input lead 67 of circuit 20 via switch 26 after a time period corresponding to the period taken for the unbalance to rotate through the angle of displacement from reference point 12. The unbalance pulse switches circuit 20 to the alternate state and thereby closes gate 15.

Clock pulses are therefore transmitted to readout 10 for a period proportional to the angular displacement of the unbalance from point 12 and records a reading in indicator 13 in degrees or the like.

The present invention thus provides a reliable digital type readout for balancing equipment and the like having an output reading which may be established in one revolution or other periodic movement of the workpiece.

Various modes of carrying out the invention are contemplated as being within the scope of the following claims particularly pointing out and distinctly claiming the subject matter which is regarded as the invention.

I claim:

1. In a digital operating device including signal means for generating a train of substantially identical pulses and a reference signal means establishing periodically occurring successive reference pulses and control means establishing a measuring signal pulse between successive reference pulses, an output means, gate means operably connecting the first named signal means to the output means, reference coupling means connecting said reference signal means to said gate means, means coupling the control means to said gate means, said control means and said reference coupling means being connected such that one means opens the gate means and the opposite means closes the gate means, and means coupling the output of the gate means to the means adapted to open the gate means to effectively disconnect the gate means from the latter means in response to transmission through the gate means.

2. In balancing equipment having a digitally driven output means and including reference signal means establishing a reference pulse once each revolution of a member and transducer means establishing an unbalance-related pulse in synchronism with the unbalance, a source of clock pulses establishing a train of substantially identical pulses, gate means operably connecting the source to the output means, reference coupling means connecting said reference signal means to said gate means, unbalance coupling means connecting the transducer means to said gate means, the reference coupling means and the unbalance coupling means being connected such that one of the coupling means opens the gate means and the opposite coupling means closes the gate means upon establishment of a reference pulse and unbalance-related pulse respectively to actuate the output means in accordance with the phase angle between the reference pulse and the unbalance-related pulse, and means coupling the output of the gate means to the coupling means opening the gate means to effectively disconnect the latter coupling means from the gate means in response to transmission through the gate means.

3. In a digital operating device including reference signal means establishing a periodically occurring reference signal and control means establishing a dependent signal, a pulse signal means, a detector means, gate means operably connecting the pulse signal means to the detector means, first reference coupling means connecting said reference signal means to said gate means to open the gate means upon establishment of a reference signal, means coupling the output of the gate means to the reference coupling means to effectively disconnect the gate means from the reference signal means, and means coupling the control means to said gate means to close the gate means upon establishment of a dependent signal, second reference coupling means connected to said reference signal means, switch means connected to selectively connect the second reference coupling means and the control means to the gate means to control closing of the gate means, and means connected to the output of the gate means and to the first and second reference coupling means for conditioning the first and second reference coupling means to transmit said reference signal.

4. In balancing equipment having digtal readout means adapted to be energized from a pulse generator in accordance with the displacement of unbalance from a preselected reference point on the rotating unit being inspected for unbalance, a first gate means connecting the pulse generator to the readout means and having a gate opening input and a gate closing input, output control means connected to the gate means to selectively establish a gate opening signal and a gate closing signal, unbalance responsive means establishing an unbalance signal in phase with unbalance in the rotating unit, a second gate means having an output connected to said output control means to establish a gate opening output and having a first input and a second input, reference means to establish a reference pulse in phase with the reference point on the rotating unit and connected to the first input of the second gate means, a third gate means connected to the reference means, switch means to selectively connect the third gate means or the unbalance responsive means to the output control means to establish a gate closing output, an independently controllable signal source having a first input for receiving an input signal and a first output connected to the second input of the second gate means to open the second gate means and having a second output to simultaneously close the third gate means, a manually controlled input means connected to said first input of said independently controllable signal source, and said signal source having a second input connected to the output of the first gate means and including means responsive to a signal at the second input to close the second gate means and to open the third gate means upon transmission of a preselected signal to the digital readout means.

5. In balancing equipment having digital readout means adapted to be energized from a pulse generator in accordance with the displacement of unbalance from a preselected reference point on the rotating unit being inspected for unbalance, a first transistorized gate means connecting the pulse generator to the readout, a transistorized bistable multivibrator connected to the gate means and having a first output state opening the gate means and a second output state closing the gate means, unbalance responsive means coupled to the rotating unit to establish an unbalance pulse in phase with unbalance in the rotating unit, reference means coupled to the reference point on the rotating unit and establishing reference pulses in phase with the reference point on the rotating unit, a second transistorized gate means connecting the reference means to the bistable multivibrator to establish the first output state, a third transistorized gate means connected to the reference means, switch means to selectively connect the third gate means or the unbalance responsive means to the bistable multivibrator to establish the second output state, an independently controllable bistable multivibrator connected to the second gate means and to the third gate means, said independently controllable bistable multivibrator having a first output state opening the third gate means and closing the second gate means and a second output state closing the third gate means and opening the second gate means, and means connecting the first gate means to the independently controllable bistable multivibrator to establish the first output state.

6. In balancing equipment having a digital measuring means for determining angle of unbalance with respect to a reference on a rotating unit to be balanced and having reference signal means to establish a reference signal in preselected phase with the reference, a digitally driven readout, a transistorized pulse generator adapted to establish a train of equally time-spaced clock pulses and having means to adjust the frequency of the pulses, a transistorized gate having a first input connected to the output of the generator and a first output connected to the readout to control transmission of clock pulses to the readout, said transistorized gate having a second input for selective opening and closing of the gate, a transistorized bistable multivibrator having an output connected to said second input of the gate and having a first input and a second input for respectively biasing the gate opened and closed, a second transistorized gate means having a first input connected to the reference signal means and an output connected to the first input of the bistable multivibrator for opening the gate and having a second input, unbalance signal means establishing an unbalance pulse in phase with the unbalance in the rotating unit and connected to said second input of the bistable multivibrator for closing said gate means, a second transistorized bistable multivibrator having a controlled input and an output connected to the second input of the second transistorized gate means for biasing the latter open and having a second input connected to the output of the first transistorized gate means for biasing the second transistorized gate means closed, a third transistorized gate means having an input connected to the reference signal means and a second input connected to the output of the second bistable multivibrator and having an output, and calibrating switch means interposed between the connection of the unbalance signal means to the second input of the first bistable multivibrator and connected to the output of the third transistorized gate means to selectively connect the output of the unbalance signal means or the output of the third transistorized gate means to the second input of the first bistable multivibrator.

7. The construction of claim 6 wherein the controlled input to said second transistorized bistable multivibrator includes a manually operated switch means for establishing an output biasing the second transistorized gate means open.

8. The construction of claim 6 wherein the pulse generator is an astable multivibrator including a variable impedance having a manually controlled setting for determining the pulse frequency of the generator.

9. In a digital operating device including pulse signal means for generating a train of substantially identical pulses and a reference signal means establishing periodically occurring successive reference pulses and control means establishing a measuring signal pulse between successive reference pulses, a detector means, gate means operably connecting the pulse signal means to the detector means, coupling means connecting said reference signal means to said gate means to selectively open and close said gate means, coupling means connecting the control means to said gate means to actuate the gate means, means in the connection of said control means and said reference coupling means to the gate means having a first state in which one means opens the gate means and the opposite closes the gate means and having a second state operably disconnecting said control means and connecting the reference signal means to alternately open and close the gate means and means connecting the output of the gate means to the means opening the gate means and operating in response to transmission through the gate means to operably disenable the means opening the gate means.

References Cited by the Examiner
UNITED STATES PATENTS

| | | | |
|---|---|---|---|
| 2,700,133 | 1/55 | Pfleger | 324—68.1 |
| 2,901,170 | 8/59 | Poole | 235—92 |
| 2,918,625 | 12/59 | Houghton | 324—68.1 |
| 2,934,825 | 5/60 | Braybrook | 324—83 |
| 2,949,228 | 8/60 | Bailey et al. | 235—177 |
| 2,962,214 | 11/60 | Gordon et al. | 235—164 |
| 3,048,041 | 8/62 | Trimble | 73—462 |

RICHARD C. QUEISSER, *Primary Examiner.*

WALTER W. BURNS, JR., JAMES J. GILL, *Examiners.*